United States Patent [19]

Bahrton

[11] 4,167,873

[45] Sep. 18, 1979

[54] FLOW METER

[75] Inventor: Per S. Bahrton, Lidingö, Sweden

[73] Assignee: Fluid Inventor AB, Stocksund, Sweden

[21] Appl. No.: 945,383

[22] Filed: Sep. 25, 1978

[30] Foreign Application Priority Data

Sep. 26, 1977 [SE] Sweden ................... 7710745

[51] Int. Cl.² ............................... G01P 1/00
[52] U.S. Cl. ..................... 73/194 B; 137/835
[58] Field of Search ........... 73/194 B, 194 C, 194 VS; 137/835

[56] References Cited

U.S. PATENT DOCUMENTS 3,690,171  9/1972  Tippetts ................. 73/194 B

FOREIGN PATENT DOCUMENTS 1363762  8/1974  United Kingdom ............... 73/194 B

*Primary Examiner*—Donald O. Woodiel

*Attorney, Agent, or Firm*—Burns, Doane, Swecker & Mathis

[57] ABSTRACT

A flow meter comprising a fluidic switching device coupled as a free-running oscillator. The frequency is dependent on the flow rate of the medium. The device called a fluidistor has a nozzle (edges) arranged upstream of the control chambers and a first region downstream of the control chambers, within which first region the flow of medium lies either on one side or the other side in dependence upon the pressure conditions and flow conditions prevailing in the oscillator circuit. A second region is located downstream of said first region. Mutually spaced apart orifices of a cross-connecting line, said orifices preferably being arranged transversely to the flow direction, are arranged at a location at which the stream of fluid is deflected, in a manner such that said orifices are coupled together, through a line. In said line is a pressure-sensing device arranged to generate a signal corresponding to the measuring result and that said deflection location is placed downstream of the control chambers.

9 Claims, 6 Drawing Figures

U.S. Patent  Sep. 18, 1979  4,167,873
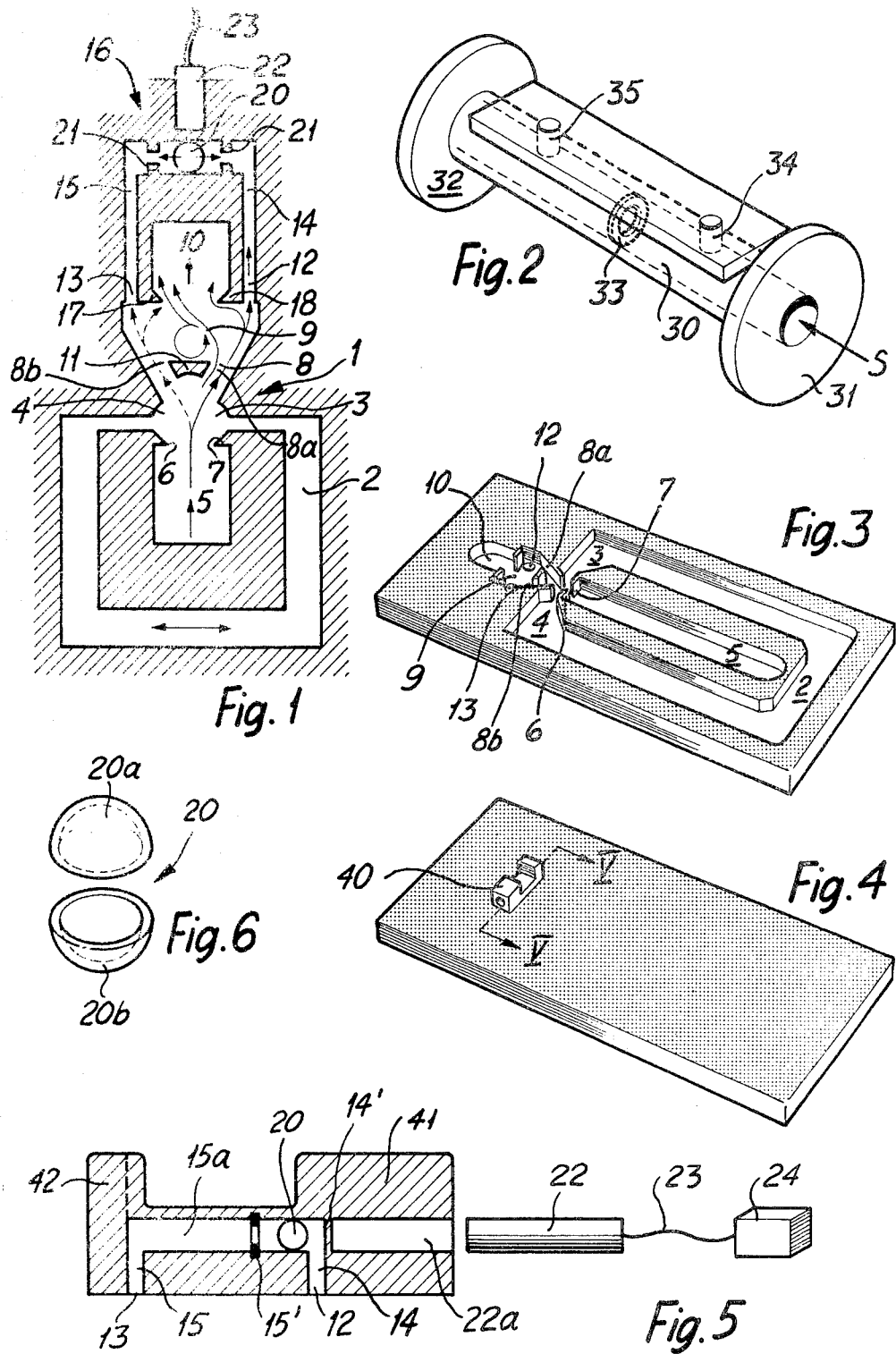

FLOW METER

FIELD OF THE PRESENT INVENTION

The present invention relates to a flow meter and, in particular to those devices which utilise a fluidic switching device, hereinafter called a fluidistor, coupled as a free-running or self-oscillating oscillator. This coupling, which causes the fluidistor to act as free-running oscillator, comprises either a cross-connection between the control chambers of the fluidistor or a cross-connection between an outlet passage and a control chamber. The frequency of such a free-running oscillator is dependent upon the rate of flow of the media or the fluid and it is thus a primary desire to construct the fludistor in a manner such that the frequency is directly dependent upon and proportional to the rate of flow of the fluid within as large a range as possible. A prime desire in this respect is to extend this range in a downward direction, so as also to include low flow rates.

Although the present invention can be used to measure the flow rate of media as both gases and liquids, the following description will be made with reference to liquid as the flowing medium.

A BACKGROUND OF THE PRESENT INVENTION

A fluidistor which satisfies the aforementioned desideratum is provided upstream of the control chambers with a nozzel, normally in the form of a constriction of a passage defined by edges, and forms downstream of the control chambers a first region within which the flow lies either on one side or the other in dependence upon the pressure conditions and flow conditions prevailing in the fluidistor circuit. This region is often called the outlet-passage region since there is normally provided downstream of the control chambers in the fluidistor a wedge or stream-divider which defines these outlet passages. Every fluidistor exhibits a further region located downstream of the first region. Without the provision of such wedges in a fluidistor, that side of the stream of fluid remote from the wall portion in this region is broken up. When the fluidistor is provided with such wedges, the two streams of fluid are mixed on respective sides of the stream-divider in said region, immediately when switching occurs from one outlet passage to the other, to form a jet.

DESCRIPTION OF PRIOR ART

A flow meter is known from the Swedish patent specification No. 7014349. This known fluidistor comprises means which causes the fluidistor to swing as an oscillator, by arranging a cross connection between the control chambers of said fluidistor. The fluidistor has outlet passages on both sides of a stream-divider and by incorporating a pressure sensing device in a connection between the outlet passages, in the first region, it is possible, with the aid of this pressure-sensing device, to acertain the oscillator frequency and thereby to establish the flow rate of the medium.

A flow meter is particularly sensitive (not porportional) at very low flow rates, and it is therefore a prime desire to obtain a picture of the flow through the fluidistor, also at low flow rates, which is not influenced by the meter, so as to maintain a linear relationship between frequency and flow.

Thus, the aforementioned Swedish patent specification describes an arrangement in which the oscillator frequency is sensed in the first region, within which the flow lies either on one side or the other, depending upon the pressure conditions prevailing in the oscillator circuit. By placing the sensing circuit in this first region and in the streamdivider an adverse effect is obtained on the picture of the flow in the fluidistor from the aspect of the measuring results. This is amplified in the aforementioned patent specification by the fact that the connection line through the stream-divider is open, and, moreover, downstream of the said connection there is in said first region a constriction in each respective outlet passage. This has been done with the intention of amplifying the pressure difference and optionally to divide a flow through the connection line. Thus, in the device according to the aforementioned Swedish patent speciﬁction the constrictions in the outlet passages must build up a static pressure difference, this pressure difference being sensed and measured in the device. The removal of the constrictions in the first region according to the Swedish patent specification would mean that only a small, if any difference, in pressure would occur in the connecting passage.

Since the outlet passage must be provided with a constriction, it is also necessary to make the stream-divider between the outlet passages considerably longer than the width of the nozzle, the said stream-divider in the exemplary embodiment being approximately thirty times the width of the nozzle.

OBJECTS OF THE PRESENT INVENTION

An object of the primary invention is to provide a flow meter in which the pressure differences to be utilised are not sensed to advantage within the first region but within a further, second region. By this means it is not only possible to exclude the restrictions in the outlet passages but that a uniform and controllable flow is ensured within the fluidistor, which means that the linear relationship between the frequency and flow is amplified in a manner such that the flow picture in the frequency sensing device does not influence the flow upstream of the fluidistor oscillator, i.e. in the region in which the nozzle and control chambers are located.

The present invention also provides the possibility of placing the cross-connecting line orifices at a distance from each other, preferably transversely of the flow direction. The said orifices are also connected to each other via the cross-connecting line in a manner such that a pressure-sensing device can be incorporated in said line, said pressure-sensing device being arranged to generate or initiate a signal corresponding to the measuring result.

For the purpose of creating a measurable pressure, the said orifices conveniently lie immediately adjacent a location at which the stream of medium is deflected, normally in a corner, whereby there is generated a pressure difference. In the exemplary embodiment, this corner has the form of a slight constriction located downstream of the said second region. Further, the orifices may be located at a distance downstream of the first region, corresponding to or substantially corresponding to the flow length within said first region. Arranged in the cross-connecting line is a metal object which is displaceable to one side or the other by variations of pressure occurring in said line, whilst in connection with said object there is a sensing device, preferably an inductive transducer. The inductive transducer is coupled to a device arranged to register and/or indicate the measurement value, via an electric conductor.

According to the invention, the density of the metal object is equal to or substantially equal to the density of the medium, such that the metal object is able to react to any change in the movement of the medium in the cross-connecting line. The metal object is preferably a hollow body having a spherical outer configuration.

BRIEF DESCRIPTION OF THE ACCOMPANYING DRAWINGS

An exemplary embodiment exhibiting the significant characterising features of the present invention will now be described with reference to the accompanying drawings, in which:

FIG. 1 illustrates the principal of the present invention,

FIG. 2 illustrates a pipe in which there is incorporated a throttle flange and in which only part of the total flow is allowed to pass the fluidistor shown in FIG. 3, FIG. 3 illustrates a fluidistor with the surface intended to face towards and co-act with a planar surface in FIG. 2, FIG. 4 illustrates the fluidistor in the position in which it co-operates with the planar surface shown in FIG. 2, FIG. 5 is a sectional view of sensing device applied to the fluidistor shown in FIG. 4, and, FIG. 6 illustrates two halves of a sphere.

DESCRIPTION OF A PREFERRED EMBODIMENT

Thus the present invention relates to a flow meter incorporating a fluidistor 1 coupled as a free-running oscillator through a cross-linking passage 2 extending between the control chambers 3 and 4 thereof. The oscillator frequency is dependent upon the flow rate of the fluid, said fluid entering at 5 and passing through a constriction defined by edges 6, 7, the control chambers 3 or 4 and past a first region 8 into a second region 9 and finally to the outlet 10. As will be seen from FIG. 1, the fluidistor has a nozzle located upstream of the control chambers 3 and 4, said nozzle having the form of the restriction 6, 7 and a first region 8 located down-stream of the control chambers. Within this first region the flow of medium is such that said flow lies either on one side of said region or the other, depending upon the pressure conditions and flow conditions prevailing in the oscillator circuit, there being optionally incorporated (although not necessarily) in said first region a stream divider 11. In the illustrated embodiment the length of the stream-divider only corresponds approximately to the width of the constriction 6, 7 although there is nothing to prevent the stream-divider from being longer. Of significance to the present invention is the said second region 9, located down stream of the first region. In the absence of a wedge in the fluidistor, the side of the stream remote from the wall portion is subject to disintegration in the second region. In the presence of a wedge in the fluidistor the two streams are mixed on respective sides of the stream divider to form a jet, this taking place in said second region at the location where switching from one outlet passage to the other takes place.

In accordance with the present invention, mutually spaced apart orifices 12, 13, of the cross-connecting line, said orifices preferably being arranged transversely of the flow direction, are arranged at a location where the stream is deflected. This is particularly suitable in the second region 9. The orifices 12, 13 are connected together through a line 14, 15 in which there is arranged a pressure-sensing device 16 adapted to generate a signal corresponding to the measured result.

The orifices 12, 13 are arranged adjacent a location where the stream is deflected in a respective corner, whereby a pressure difference is generated. In the exemplary embodiment each corner has the form of a slight constriction located immediately upstream of a construction 17, 18 located in the second region 9. The orifices 12 and 13 may be located at a distance downstream of the first region 8 corresponding and/or substantially corresponding to the length of the stream or medium within the first region 8.

Arranged in the line 14 and 15 between the orifices 12 and 13 is a metal object forming part of a pressure-sensing device. This metal object is referenced 20. The metal object is displaceable to one side or the other as a result of variations in pressure occurring in the lines 14, 15 in dependence upon whether the flow is permitted to pass through the region 8a or the region 8b. Displacement of the metal object conveniently takes place between stops 21 shown in the figure and is detected by a inductive transducer.

The inductive transducer conveniently comprises a transducer sold by Pepper V Fuchs under the trade name NJ4-12GK.

The electrical or inductive transducer 22 is connected through an electric conductor 23 with a device adapted to register and/or indicate the measured value, said device being of known construction and being referenced 24 in FIG. 5.

The density of the metal object 20 is equal to or substantially equal to the density of the fluid passing through the lines 14, 15. The metal object comprises a hollow body, preferably a hollow sphere. The hollow body may comprise two parts joined together in some suitable manner. By adapting the thickness of the material of the hollow sphere to the external volume of the sphere it is possible to select both size of the sphere and said material thickness in a manner such that its density coincides with or substantially coincides with the density of the flowing medium.

In FIG. 2 there is illustrated a pipe through which a total flow "S" is caused to pass. The pipe 30 is provided with flanges 31 and 32 and has arranged therein a constriction 33 which causes a part-flow to pass through a pipe 34 and then out through a pipe 35. The pipes 34 and 35 open out on to a flat plate against which the visible surface of the fluidistor in FIG. 3 shall lie. The pipe 34 communicates with the inlet passage 5 and hence this part-flow is permitted to pass in through the nozzle 6 and 7 of the fluidistor and, depending upon the pressure conditions in the control chambers 3 and 4 and the pressure condition in the passage 2, the part-flow will either lie to the right against part 8a or to the left against 8b. The pressure difference occurring within the second region 9 is sensed via the orifices 12 and 13 before the medium passes through the outlet 10 and the line 35 back to the pipe.

FIG. 4 illustrates the manner in which the orifices 12 and 13 co-operate with a sensing device 14, which is shown in cross-sectional view through the line V—V in FIG. 4.

As will be seen from FIG. 5, the sensing device comprises two parts 41 and 42, the two parts being arranged to be screwed together. The orifice 12 is arranged to co-operate with the pipe 14 while the orifice 13 is arranged to co-operate with the pipe 15 which both form a chamber 15a in which a sphere 20 is placed. In the illustrated embodiment the sphere 20 can either move towards a wall potion 14' in the line or against an O-ring 15'. By removing the part 42 the sphere 20 can be moved into the section 15 of the line into the correct position. The inductive transducer 22 is insertable in a hole 22a in the sensing device and is thereby able to detect the position of the sphere 20. Thus, the transducer is in electrical connection, through the line 23 with a measuring device 24, the nature of which forms no part of the present invention and will not therefore be described in detail.

FIG. 6 shows how the sphere 20 may comprise two parts 20a and 20b. The two parts are hemi-spherical and are fastened one to the other in any suitable manner.

The inductive transducer 20 is arranged to emit pulses on the line 23, these pulses being read per unit of time in the measuring unit 24. Since the number of pulses per unit of time is directly proportional to the part flow through pipes 34 and 35 and this part-flow, in turn, is directly proportional to the total flow "S," as a result of the flange 33, the measuring device 24 is able to evaluate the flow in the line with great accuracy.

For the sake of clarity, the means for attaching the fluidistor of FIG. 3 to the plate of FIG. 2 are not shown.

The invention is not restricted to the described embodiment, but can be modified within the scope of the following claims.

What is claimed is:

1. A flow meter comprised of a fluidistor coupled as a free-running oscillator having a frequency responsive to the flow rate of a fluid medium passing therethrough, said fluidistor including:
    at least one control chamber for controlling oscillation of the fluid medium passing through said fluidistor;
    a nozzle located upstream of said control chamber in the direction of fluid flow through said fluidistor;
    a first flow region, located downstream of said control chamber, in which the flow of fluid medium therethrough oscillates from side to side of the region in dependence upon the pressure and flow conditions of the fluid medium within said fluidistor;
    a second flow region located downstream of said first region including a location at which the flow of medium is deflected and a pressure differential is created across said second region;
    a pair of spaced apart orifices disposed transversely to the direction of fluid flow through said fluidistor and arranged on respective sides of said second flow region at the deflection location;
    a connecting line establishing fluid communication between said orifices; and
    a pressure sensitive device operatively associated with said connecting line for generating a signal related to the rate of flow of fluid through said fluidistor.

2. A flow meter according to claim 1, characterised in that the orifices are located immediately upstream of a constriction in said second region.

3. A flow meter according to claim 1, characterised in that the orifices are located downstream of the first region at a distance from said first region substantially corresponding to the length of the path of flow for fluid through the first region.

4. A flow meter according to claim 1, characterised in that a metal object is located in said connecting line and is displaceable to one side or the other as the result of pressure variations occurring in the connecting line.

5. A flow meter according to claim 4, characterised in that a sensing device is located in cooperative relationship with said metal object and is coupled, via an electric conductor, to a device arranged to register the frequency of movement of said metal object.

6. A flow meter according to claim 4, characterised in that the density of the metal object is substantially equal to the density of the fluid medium.

7. A flow meter according to claim 4, characterised in that the metal object is a hollow spherical body.

8. A flow meter according to claim 7, characterised in that the hollow body comprises two parts joined together.

9. A flow meter according to claim 1, characterised in that only a part of the flow of the total fluid flow to be measured is permitted to pass through the fluidistor.

* * * * *